March 6, 1928.  W. T. VAN ORMAN  1,662,018
LEAKPROOF TANK COVER
Filed April 28, 1921   2 Sheets-Sheet 1
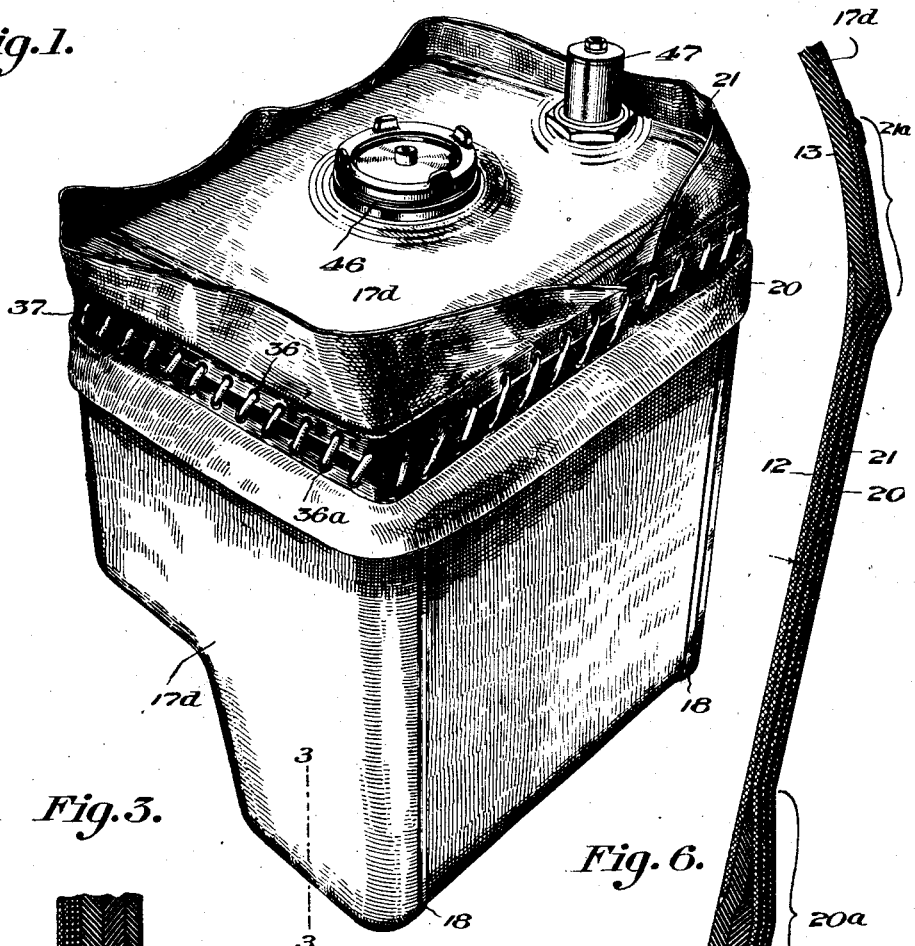
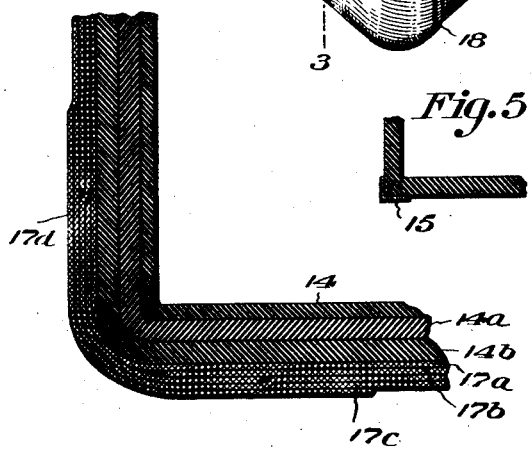
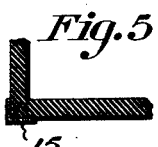
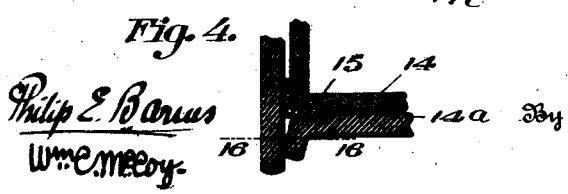
Inventor
Ward T. Van Orman
Attorney March 6, 1928. 1,662,018

W. T. VAN ORMAN

LEAKPROOF TANK COVER

Filed April 28, 1921 2 Sheets-Sheet 2

Inventor
Ward T. Van Orman

Attorney

Patented Mar. 6, 1928.

1,662,018

UNITED STATES PATENT OFFICE.

WARD T. VAN ORMAN, OF AKRON, OHIO, ASSIGNOR TO THE GOODYEAR TIRE & RUBBER COMPANY, OF AKRON, OHIO, A CORPORATION OF OHIO.

LEAKPROOF TANK COVER.

Application filed April 28, 1921. Serial No. 465,164.

My invention relates to leakproof covers for gasoline tanks, and its object is to provide a cover for gasoline tanks that will reduce fire hazards, and prevent the leakage of gasoline from the tanks of airplanes, or the like, after crashes and when the tanks are penetrated by bullets or missiles during combat work.

Heretofore various efforts have been made to construct covers for gasoline tanks, of airplanes in particular, that would seal themselves after being penetrated and thus prevent the escape of gasoline.

A tank cover constructed in accordance with my invention differs from the tank covers that have heretofore been suggested in that it proposes a novel arrangement of the materials used in the manufacture of the cover.

The various objects and advantages to be obtained from practicing my invention will be apparent from the following description and the accompanying drawings, in which:

Fig. 1 is a view, in perspective, of a tank cover constructed in accordance with my invention;

Fig. 3 is a fragmentary sectional view of a lower corner of the tank cover, taken substantially on the line 3—3 of Fig. 1 and showing the arrangement of the layers of rubber and plies of fabric at the corner of the tank;

Figs. 4 and 5 are sectional views showing the method of joining the layers of rubber at the corners of the tank cover;

Fig. 6 is an enlarged vertical sectional view through the side of the tank cover, with parts broken away, and is intended to show the arrangement of the materials employed in the construction of the tank cover;

Figure 2:
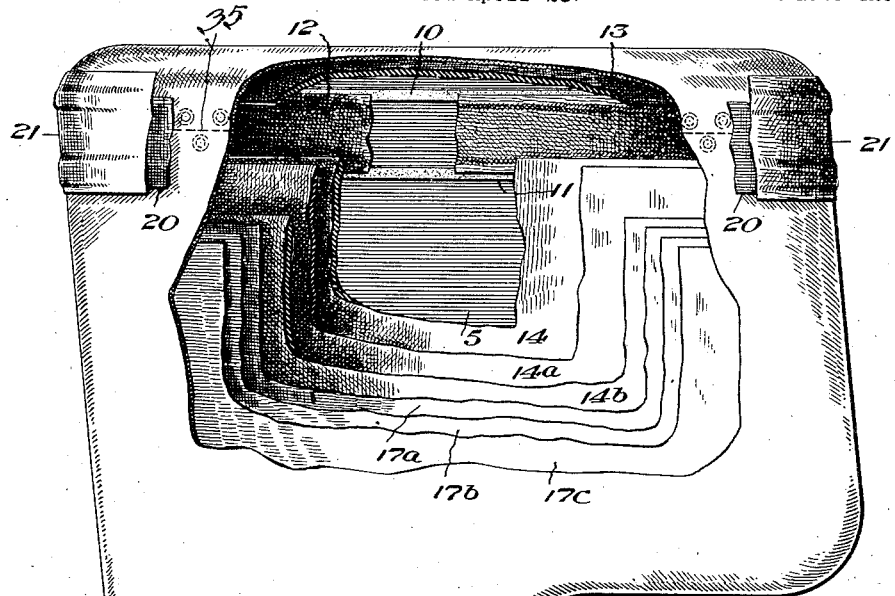
Fig. 2 is a side elevational view of a leakproof cover, with parts broken away to show its construction.

Fine Pará rubber that is compounded with substantially 6% of sulphur and 2% of litharge, forms a compound of such a nature that when it is immersed in gasoline, it absorbs a sufficient quantity of that liquid to materially increase its size. The particular compound of this nature that is employed in the construction of the tank herein described, has been found to be capable of expansion to substantially ten times its original volume when placed in gasoline.

A particularly valuable property of this compound is the fact that no chemical change is effected in the rubber composition by its absorption of gasoline and, if the compound, in its swollen condition, is subjected to the heat of sunlight or to a moderate temperature, the gasoline will be completely driven from the material which then returns to its original condition. These are particularly valuable characteristics of the material that is empoyed, since it permits the tank to be repaired after it has been penetrated, and also prepares a container for the gasoline, the material of which neither dissolves in the gasoline nor is chemically affected by the gasoline, and which regains its original physical and chemical characteristics when immersed in gasoline and subsequently heated.

It should be understood that this composition is merely illustrative of a number of rubber compounds that may be employed in the manufacture of a tank cover embodying the essential features of my invention.

Having thus described a suitable rubber compound that may be employed in the manufacture of this tank cover, the mechanical features of the cover will next be explained by referring to the accompanying drawings.

In general, my tank cover embodies a relatively thick layer of rubber compound that extends over the lower portion of a gasoline tank, a relatively thin layer of a similar compound that extends over the top portion of the tank, and a fabric cover that extends over the entire tank but which is much thicker over the lower portion of the tank than over the upper portion. The rubber compound and fabric are vulcanized together.

A detailed understanding of the construction of the tank cover may best be obtained by following its process of construction. For this purpose, attention is invited to Fig. 2 which shows a mold 5 of the same size and shape as a gasoline tank with a cover mounted thereon. The mold is first entirely covered with a coating of rubber cement to insure the exclusion of all air from between the mold and the cover. A pair of gum strips 10 and 11 are placed around the mold a few inches from its top. The strips 10 and 11 are separated a sufficient distance to permit a strip 12 of heavy fabric to overlap one edge of each of the gum strips. The gum strips and the strip 12 of fabric extend completely around the mold and are joined at their respective ends and are stitched to close engagement with the mold.

A layer or rubber composition 13, which is preferably formed of laminated stock, is next applied to the top of the tank. This layer of rubber extends down and overlaps the upper edge of the fabric strip 12 a short distance. A similar layer of rubber 14 is applied to the lower portion of the tank and arranged to overlap the lower edge of the fabric strip 12. These layers of rubber composition are joined along their vertical edges and each of the joints is covered by a layer of gum 15 in the form shown in Figs. 4 and 5. As there shown, the abutting sheets of rubber are stitched to close engagement, and the excess rubber is removed along the line 16—16 before the gum strip 15 is applied to the seam.

Referring again to Fig. 2 of the drawings, two additional layers of rubber compound $14^a$ and $14^b$ are applied over the layer 14 and are closely stitched thereto in such manner as to exclude all entrapped air that might otherwise remain between the successive layers of composition. Each layer of rubber is of less height on the tank than the preceding layer, as indicated in Fig. 6 which is a vertical sectional view on lines 3—3 of Fig. 1.

Three successive layers of frictioned fabric $17^a$, $17^b$ and $17^c$ are next applied to the lower portion of the tank as shown in Fig. 6 and each layer is cut back from the preceding layer in such manner as to form a tapered upper edge. The taper of this edge of the fabric substantially registers with the taper of the rubber composition at this point, and, therefore, forms a gradually reduced thickness of outside coating at the juncture of the upper with the lower portion of the cover for the tank.

The corners of each of these layers of fabric are overlapped a short distance, preferably about one-half inch, and the corner joints are so staggered as to position the seams of alternate layers on alternate sides of the corners and so placed that no two seams are positioned one over the other.

An outer layer $17^d$ of frictioned fabric is next placed over the entire surface of the cover after a coating of cement is applied thereto. This outer layer is carefully stitched to the contour of the tank and all seams are covered by a gum strip 18. The gum strips used to cover the joints of fabric are skived to improve the appearance of the tank and to prevent the admission of steam between the layers of the cover during vulcanization.

The lower edge of a flap 20 is next gummed and cemented to the cover in the zone $20^a$ as shown in Fig. 6 and a piece of holland cloth is cemented between the upper portion of the flap and the outer layer $17^d$ of the fabric of the cover in such position as to prevent a union between these portions of the flap and cover during vulcanization. This flap extends completely around the cover. An outer flap 21 is next gummed and cemented to the tank cover along its uppermost edge in the zone $21^a$ and extends completely around the tank and overlaps the flap 20. A piece of holland cloth is placed between the remaining free portions of the flap 21 and the flap 20 in order to prevent a union between these portions of the cover.

The tank is now in condition for its vulcanization, which is performed in an open heater at substantially 40 pounds steam pressure.

In order to avoid any undue inherent tension in the rubber composition or an unnecessary compression of the material during vulcanization, the tank is merely wrapped sufficiently to prevent bagging which might develop along the inner face 30 of the cover if it were not maintained in intimate contact with the tank mold. This wrapping is found advisable because of the particular design to tank employed. The remaining portions of the tank are merely subjected to the steam pressure during vulcanization.

Figure 7:
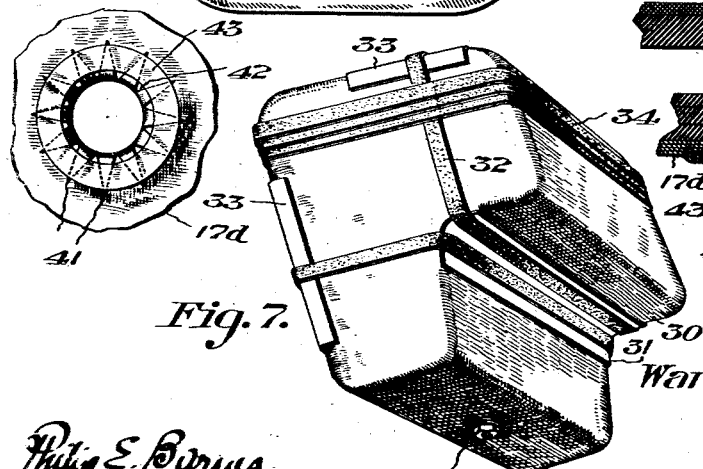
Fig. 7 is a view, in perspective, of a tank cover constructed in accordance with my invention and prepared for final vulcanization.

A sheet metal angle piece 31 is placed in the shoulder 30 of the tank and wrapped with strips of fabric 32 that extend around the upper portion of the tank and also around the side portion of the tank to secure the metal piece 31 in place. Corner protecting braces 33 are placed over the corners of the tank in order that the fabric 32 will not exert uneven pressures which might damage such corners by reducing the thickness of rubber over its area of contact at the corners of the tank. A layer of fabric 34 is next wound around the overlapped flap portions of the cover to hold these portions in secure engagement. This is desirable because the holland cloth prevents close adherence of the successive layers, although both surfaces of the holland cloth are covered with cement before it is incorporated in the tank structure. The cover, after being partially wrapped, as indicated in Fig. 7, is placed in the heater and vulcanized.

After vulcanization, the top and bottom portions of the cover are severed along a line 35, shown in dotted line in Fig. 2, which leaves the flap 21 connected to the top of the cover and the flap 20 connected to the bottom portion of the cover. The two portions of the severed strip of fabric are next provided with a series of metal eyelets 36, also shown in dotted outline in Fig. 2, for lacing the two portions together.

The cover, in its completed form, is mounted on a gasoline tank and is securely laced thereto by a cord 37 that extends alternately between rows of eyelets 36 and 36ª in the top and the bottom portions of the cover. The flap 20 is then folded over the laced union of the cover parts, and the flap 21 is folded down over the flap 20. The loose edges of these flaps may, if desired, be cemented to the cover against which they rest in order to form a more secure union therewith.

Figure 10:
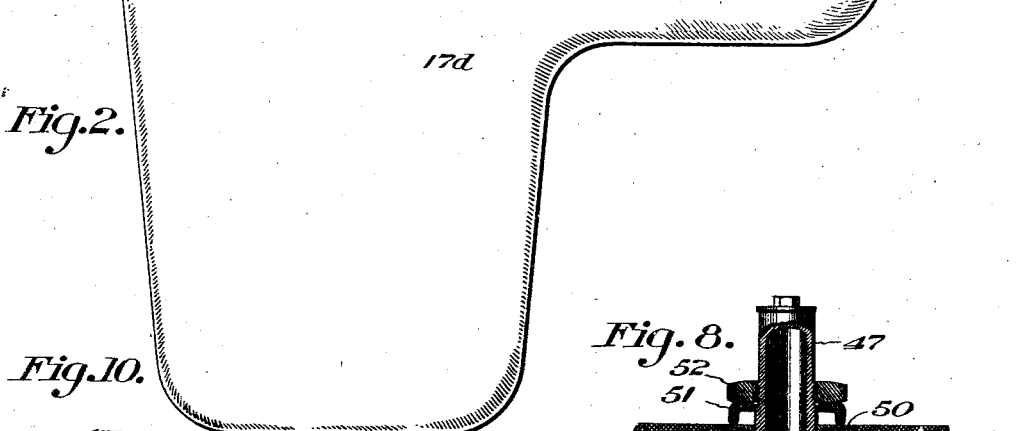
Fig. 10 is a bottom plan view of a portion of one of the layers of fabric showing the construction around the tank outlet illustrated in Fig. 9.
Figure 9:
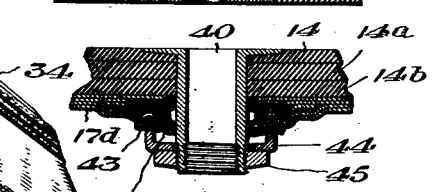
Fig. 9 is a fragmentary sectional view of a tank outlet for the bottom of the tank.

The connections to the tank are preferably made as illustrated in Figs. 9 and 10 which are, respectively, a sectional view through a connection 40 to the bottom of the tank, and a bottom plan view of a layer of fabric and the method of reinforcing the opening for the tank connection.

Openings are cut through the various layers of rubber of such size as to snugly fit the tank connection 40. Openings for the tank connection 40 are provided through each of the fabric layers by first making a series of radial cuts that provide a plurality of tongues 41 as shown in Fig. 10. A small reinforcing ring 42, of either multi or single strand wire, is placed over the opening and the tongues are pulled through the ring and cemented or otherwise secured to the body of the fabric. A reinforcing fabric washer 43 is next cemented over the tongues to secure them in place between the washer 43 and the body of the fabric.

A reinforcing ring is similarly attached to each layer of fabric. The successive rings may, however, be of different diameters to stagger them in the assembled structure as illustrated in Fig. 9.

A cupped metal washer 44 compresses the material around the tank connection 40 to prevent the leakage of gasoline therefrom if the tank is punctured and gasoline collects in the tank cover. A nut 45 secures the washer 44 in place.

Figure 8:
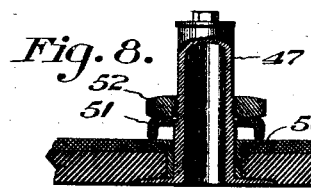
Fig. 8 is a sectional view of the tank outlet, particularly illustrating the method of sealing the cover where connections are made to the tank.

A corresponding construction may be employed around the top connections 46 and 47 of the tank or the structure shown in Fig. 8 may be used. The fragmentary sectional view of the connection 47 illustrates a sleeve 50 of metal or molded composition that fits snugly around the connection and compresses the material adjacent the tank connection. A washer 51 and nut 52 retain the sleeve 50 in place.

In service, if the tank and cover are punctured by a bullet or missile, the gasoline that escapes from the punctured tank quickly saturates the composition in the immediate vicinity of the puncture and causes the composition to expand a sufficient degree to close the opening. Any additional gasoline that may leak from the tank then collects within the rubber container, and feeds in the usual way through the carburetor connections to the engine. In fact, a gasoline tank was entirely collapsed during experimental tests and the cover retained all of the gasoline without material bulging or distortion. This is particularly valuable in combat work where a number of bullets may enter the tank, some even of the incendiary type, without interrupting the supply of gasoline to the engine or causing a serious loss of fuel.

The tank cover may be removed after the airplane, or whatever craft the cover is employed with, is placed in the shops for repair. After the cover is subjected to gentle heat for a short period of time, the gasoline vapor is driven from the rubber composition and the composition of the tank cover contracts to its normal thickness. The punctures in the cover may then be readily located and repaired, and the cover again placed in service by being laced over another gasoline container.

In crashes and the like, where an airplane drops with sufficient violence to destroy the gasoline tank, the flexible container catches the gasoline, and, by reason of its inherent elasticity, it absorbs the jar of the fall and prevents the escape of the gasoline to the wrecked machine. The leakage of fuel often results in fires being started where the gasoline contacts with the hot engine parts, as has been the repeated experience of aviators in the recent war. My invention consequently achieves a highly desirable result in obviating the danger incident to the leakage of fuel under any circumstances.

Various modifications of my invention may be effected without departing from the spirit and scope of my invention, and I desire, therefore, that only such limitations shall be imposed as are set forth in the accompanying claims.

What I claim is:

1. A cover for a tank comprising a layer of relatively soft laminated rubber over the lower portion of the tank, a layer of relatively soft rubber over the upper portion of the tank, a strip of fabric joining the upper and lower layers, and an outside layer of fabric covering the entire tank.

2. A cover for a tank comprising a relatively thick layer of soft rubber over the lower portion of the tank, a relatively thinner layer of rubber over the top portion of the tank, a layer of fabric intermediate the two rubber covered portions of the tank, and an outer covering of fabric extending over the entire tank.

3. A cover for a fuel tank comprising a layer of rubber over the bottom portion of the tank, a layer of rubber spaced from the first layer disposed over the top portion of the tank, and an intermediate layer of fabric extending between and vulcanized to the respective layers of rubber.

4. A cover for a fuel tank comprising a top and a bottom cover portion each comprising relatively soft non-soluble but gasoline absorbent material having edge portions of fabric, an outside layer of fabric covering said cover portions, securing means adapted to draw the fabric edge portions of the cover together, and a flap vulcanized to one of said portions and adapted to cover said securing means.

5. A removable cover for a fuel tank comprising a top cover portion, a bottom cover portion embodying a relatively thick layer of rubber over the lower portion of the tank adapted to contact with the surface thereof, a strip of fabric joining the top and bottom cover portions, an outside layer of fabric covering the entire tank, and overlapping flap portions each having an edge portion secured to one of the cover portions of the tank.

6. A removable cover for a fuel tank comprising a top and a bottom cover portion each composed of an inner layer of highly resilient gasoline absorbent non-soluble rubber adapted to contact with the surface of the tank enclosed by the cover, an outer reinforcing and protecting layer of fabric vulcanized thereto, a strip of fabric extending between one side of the top and bottom cover portions and vulcanized to each portion to provide a hinge therebetween, a strip of fabric vulcanized to the remaining upper edge of the bottom cover portion, a strip of fabric extending around the corresponding edge of the top cover portion, each of said strips of fabric having a series of spaced eyelets formed therein and adapted to receive a lacing adapted to draw the edge portions together, and a flap of fabric having one edge thereof vulcanized to one of said cover portions and adapted to be folded down over the lacing, the layer of rubber over the lower portion of said tank being materially thicker than the layer of rubber over the upper portion of said tank.

7. The method of forming a tank cover which consists in applying a layer of rubber over the top portion of a mandrel formed in the shape of the tank for which the cover is intended, applying a materially thicker layer of rubber over the lower portion of the mandrel, both layers of rubber being applied directly to the surface of the mandrel, applying a layer of frictioned fabric over the entire surface of the mandrel totally enclosing both the rubber covered and exposed portions of the mandrel, applying a strip of holland cloth around three sides of the mandrel intermediate the rubber covered portion of the mandrel, applying a strip of fabric over the strip of holland with one edge portion extending beyond one edge of the strip of holland and making vulcanizable engagement with the fabric covering along said edge portion, applying a second layer of holland directly over the first layer of holland, applying a second strip of vulcanizable fabric over said second strip of holland and extending over one edge thereof to vulcanizable engagement with the other cover portion, and vulcanizing said assembled cover.

8. The method of constructing a cover for a fuel tank which comprises placing a band of rubberized fabric completely around a mandrel of the exact shape of the fuel tank near the top portion thereof, placing a layer of vulcanizable rubber over the top portion of the mandrel and slightly overlapping the upper edges of the fabric band, placing a second layer of rubber over the bottom portion of the mandrel and slightly overlapping the lower edge of the fabric band, applying a layer of frictioned fabric over the entire surface of the mandrel completely enveloping the same, vulcanizing said assembled unit, severing the fabric intermediate the zones of connection with the respective layers of rubber, removing the mandrel, and applying securing means to each of the severed edge portions of the fabric In witness whereof I have hereunto signed my name.

WARD T. VAN ORMAN.